United States Patent
Anhut et al.

(10) Patent No.: US 11,422,347 B2
(45) Date of Patent: Aug. 23, 2022

(54) OPTICAL ASSEMBLY FOR SCANNING EXCITATION RADIATION AND/OR MANIPULATION RADIATION IN A LASER SCANNING MICROSCOPE, AND LASER SCANNING MICROSCOPE

(71) Applicant: Carl Zeiss Microscopy GmbH, Jena (DE)

(72) Inventors: Tiemo Anhut, Jena (DE); Matthias Wald, Jena (DE); Daniel Schwedt, Jena (DE); Beate Böhme, Großpürschütz (DE)

(73) Assignee: Carl Zeiss Microscopy GmbH, Jena (DE)

( * ) Notice: Subject to any disclaimer, the term of this patent is extended or adjusted under 35 U.S.C. 154(b) by 90 days.

(21) Appl. No.: 16/641,567

(22) PCT Filed: Aug. 23, 2018

(86) PCT No.: PCT/EP2018/072821
§ 371 (c)(1),
(2) Date: Feb. 24, 2020

(87) PCT Pub. No.: WO2019/038407
PCT Pub. Date: Feb. 28, 2019

(65) Prior Publication Data
US 2020/0183139 A1 Jun. 11, 2020

(30) Foreign Application Priority Data
Aug. 25, 2017 (DE) .......... 102017119480.0

(51) Int. Cl.
*G02B 21/00* (2006.01)
*G02B 27/28* (2006.01)
*G02B 3/06* (2006.01)

(52) U.S. Cl.
CPC ..... *G02B 21/0048* (2013.01); *G02B 21/0032* (2013.01); *G02B 21/0076* (2013.01); *G02B 27/283* (2013.01); *G02B 3/06* (2013.01)

(58) Field of Classification Search
None
See application file for complete search history.

(56) References Cited

U.S. PATENT DOCUMENTS

| 7,715,078 | B2 | 5/2010 | Okugawa |
| 2004/0031930 | A1* | 2/2004 | Wolleschensky .. G02B 21/0032 250/458.1 |

(Continued)

FOREIGN PATENT DOCUMENTS

| DE | 10 2014 017 002 A1 | 5/2016 |
| DE | 10 2016 102 286 A1 | 8/2017 |

(Continued)

OTHER PUBLICATIONS

Chinese Office Action for 2021 073 002 390 510 dated Aug. 4, 2021 with English translation.

(Continued)

*Primary Examiner* — Derek S. Chapel
(74) *Attorney, Agent, or Firm* — Duane Morris LLP

(57) ABSTRACT

An optical assembly for scanning excitation radiation and/or manipulation radiation in a laser scanning microscope. The assembly an optical scanning unit as a first focusing device for providing a first pupil plane, a first beam deflecting device, which is made of a first scanner arranged in the first pupil plane, for scanning the excitation radiation and/or manipulation radiation in a first coordinate direction, and a second focusing device for generating a second pupil plane, which is optically conjugated to the first pupil plane. A second beam deflecting device is provided for deflecting the excitation radiation and/or manipulation radiation, said second deflecting device being arranged in the second pupil (Continued)

plane. A third focusing device is provided in order to generate a third pupil plane, optically conjugated to the first pupil plane. A third beam deflecting device is arranged in the third pupil plane in order to deflect the excitation radiation and/or manipulation radiation, and a variable beam deflecting means is provided in order to switch an optical beam path between a first beam path and a second beam path.

27 Claims, 4 Drawing Sheets

(56) References Cited

U.S. PATENT DOCUMENTS

| | | | | |
|---|---|---|---|---|
| 2016/0131881 | A1* | 5/2016 | Boehme | G02B 21/0048 359/202.1 |
| 2021/0157113 | A1* | 5/2021 | Anhut | G02B 21/0076 |
| 2021/0157117 | A1* | 5/2021 | Anhut | G02B 27/283 |

FOREIGN PATENT DOCUMENTS

| | | |
|---|---|---|
| DE | 10 2014 017 001 A1 | 5/2018 |
| DE | 100 50 529 B4 | 6/2018 |
| EP | 1 970 744 A1 | 9/2008 |
| EP | 2 042 905 A1 | 4/2009 |
| EP | 2 042 905 B1 | 4/2016 |
| WO | 2015/158861 A1 | 10/2015 |

OTHER PUBLICATIONS

Notification of Transmittal of Copies of Translation of International Preliminary Report of Patentability dated Mar. 5, 2020.
Translation of International Preliminary Report of Patentability dated Mar. 5, 2020.
German Search Report for DE 10 2017 119 480.0 dated Jun. 18, 2018.
Dean, Kevin M., et al.; "Deconvolution-free Subcellular Imaging with Axially Swept Light Sheet Microscopy"; Biophysical Journal 2015; 108(12):2807-2815.
Archer-Zhang, Christian Chunzi, et al.; "Dynamic performance of microelectromechanical systems deformable mirrors for use in an active/adaptive two-photon microscope"; Journal of Biomedical Optics 2016; 21(12):121507-1-121507-10.
English translation of Chinese Office Action for 2018 800 55202.2 dated Mar. 30, 2022.

* cited by examiner

OPTICAL ASSEMBLY FOR SCANNING EXCITATION RADIATION AND/OR MANIPULATION RADIATION IN A LASER SCANNING MICROSCOPE, AND LASER SCANNING MICROSCOPE

RELATED APPLICATIONS

The present application is a U.S. National Stage application of International PCT Application No. PCT/EP2018/072821 filed on Aug. 23, 2018 which claims priority benefit of German Application No. DE 10 2017 119 480.0 filed on Aug. 25, 2017, the contents of each are incorporated by reference in their entirety.

FIELD OF THE INVENTION

The present invention relates, in a first aspect, to an optical arrangement for scanning excitation radiation and/or manipulation radiation in a laser scanning microscope according to the preamble of the first claim directed to an optical arrangement. In a further aspect, the invention relates to a laser scanning microscope according to the preamble of the first claim directed to a laser scanning microscope.

BACKGROUND OF THE INVENTION

A generic optical arrangement for scanning excitation radiation and/or manipulation radiation in a laser scanning microscope, and specifically in a laser scanning fluorescence microscope, is described for example in DE 10 2014 017 001 A1 and includes the following components: a scan optical unit as a first focusing device for providing a first pupil plane, a first beam deflection device, which is formed by a first scanner arranged in the first pupil plane, for scanning the excitation radiation and/or manipulation radiation in a first coordinate direction, a second focusing device for generating a second pupil plane, which is optically conjugate with respect to the first pupil plane, and a second beam deflection device for deflecting the excitation radiation and/or manipulation radiation, which is arranged in the second pupil plane.

A generic laser scanning microscope, and specifically in a confocal laser scanning fluorescence microscope, is likewise disclosed by DE 10 2014 017 001 A1 and has the following components: at least one laser light source for emitting laser radiation for exciting and/or manipulating a sample, at least one principal colour splitter for separating excitation radiation and/or manipulation radiation, on the one hand, and wavelength-shifted detection light emanating from a sample, on the other hand, and at least one microscope objective for guiding and focusing excitation radiation and/or manipulation radiation onto a sample and for guiding and collimating detection light, emanating from the sample, back in the direction of the principal colour splitter, and a detection module for detecting the detection light.

Laser scanning microscopy has become established as an indispensable tool in biomedical research. Besides pure imaging, the optical manipulation of samples is becoming ever more important.

A general technical problem here consists in generating, with the least possible expenditure in the most compact structural space possible and with the least possible transmission losses, a plurality of optical pupils which are in each case imaged onto one another. The number of usable pupils here is intended to be greater than or equal to three. The intention is to be able to switch between at least two of the pupils made available.

Known solutions are based firstly on the use of different ports on the stand. This is disadvantageous since the microscope stand becomes complicated and expensive as a result. Furthermore, under certain circumstances it is then not possible to implement further methods such as, for example, high-resolution microscopy on the same stand. Moreover, complex adjustments often have to be carried out in order to bring the respective image fields to congruence with one another.

Known solutions for manipulation by means of only one scan objective are generally mechanical and thus often relatively slow. In general it is virtually impossible for relatively large masses such as are constituted by mirrors, for example, to be switched faster than 10 ms. Relatively short switching times can be achieved with galvanometric scanners. However, in that case it must be endeavoured to keep the mass moment of inertia low.

U.S. Pat. No. 7,715,078 discloses switching between a plurality of scanners. Here, in addition to the scanners that are necessary for the actual scanning of a sample, at least two further scanners are required, these being used to switch the beam paths. Moreover, the embodiments explained in said document also disclose a refractive optical unit represented as a simple lens. However, here it is not possible to accommodate a z-scanning mirror in a fourth pupil. Said mirror is required, however, particularly for a three-dimensional optical manipulation. The optical elements here have the degree of complexity of a scan objective that is complex and not very light-efficient.

EP 2 042 905 B1 discloses a combination of two scanner pairs. One scanner pair or the other scanner pair can respectively be selected here. However, individual axes cannot be switched in very rapidly because the masses to be moved are comparatively large.

DE 100 50 529 B4 discloses the combination of a plurality of beam deflection units each consisting of two beam deflection modules. Imaging optical units between the beam deflection devices are also described in the exemplary embodiments. However, there are no possibilities for switching between different scan modes. No means for wavefront influencing are described either.

SUMMARY OF THE INVENTION

One problem addressed by the present invention can be considered that of creating an optical arrangement that provides further pupil planes, wherein only little additional structural space is intended to be taken up. Moreover, the intention is to be able to switch back and forth between the pupil planes as rapidly as possible. Finally, the intention is to create a laser scanning microscope having additional pupil planes in which it is possible to switch back and forth between the different pupil planes as rapidly as possible.

This problem is solved by means of the optical arrangement having the features set forth in the annexed claims. With regard to the microscope, the problem is solved by means of the laser scanning microscope having the features set forth in the annexed claims.

The optical arrangement of the type specified above is constructed according to the invention by virtue of the fact that a third focusing device is present for generating a third pupil plane, which is optically conjugate with respect to the first pupil plane, that in the third pupil plane a third beam deflection device is arranged for deflecting the excitation radiation and/or manipulation radiation and that a variable beam deflection means is present for switching an optical beam course between a first beam path and a second beam path.

Particularly preferably, the first beam path can run at least from the variable beam deflection means via the third beam deflection device whilst bypassing the second beam deflection device to the first scanner. Particularly preferably, the second beam path can run at least from the variable beam deflection means whilst bypassing the third beam deflection device via the second beam deflection device to the first scanner.

The laser scanning microscope of the type specified above is constructed according to the invention by virtue of the fact that an optical arrangement for scanning excitation radiation and/or manipulation radiation according to the invention is present.

The dependent claims relate to advantageous variants of the optical arrangement according to the invention and of the laser scanning microscope according to the invention and said variants are additionally described below, in association with the annexed drawing figures.

Optical arrangement in the context of the present description denotes an arrangement having beam shaping components, such as lenses and concave mirrors, and beam deflecting components, such as mirrors, which can be movable.

For the second and third beam deflection devices what is of importance is that the radiation is deflected in a defined manner. Particularly preferred variants are distinguished by the fact that the second beam deflection device in the second pupil plane is a second scanner for scanning the excitation radiation and/or the manipulation radiation, in particular in a second coordinate direction, which is different from the first coordinate direction, and/or that the third beam deflection device in the third pupil plane is a third scanner for scanning the excitation radiation and/or the manipulation radiation, in particular in a second coordinate direction, which is different from the first coordinate direction.

The term scanning is understood to mean the controlled guidance of a beam of the excitation radiation or the manipulation radiation over a sample. This scanning can be carried out in a regular pattern, for example line by line, but also along a trajectory that is to be predefined.

In the context of the present description, the term scanners, for example first, second and third scanners, denotes devices that can alter the direction of a beam at least in one coordinate direction. Pivotable mirrors are particularly preferably used as scanners.

For the purposes of this description, excitation radiation is understood to mean electromagnetic radiation, particularly visible light, but also infrared and ultraviolet radiation, which is generally used for imaging. Said excitation radiation is very generally provided by lasers. Various contrast methods can be used in this case. Particular preference is given to radiation for exciting fluorescence from dyes with which a sample to be examined is prepared. A laser scanning fluorescence microscope is used to measure this fluorescent light. In principle, however, illumination light for light microscopy can also be involved.

Manipulation radiation denotes electromagnetic radiation, such as in the visible range, but also in the infrared and ultraviolet ranges, which can be used to realize a targeted alteration of a sample to be examined, in a spatial region selected in a targeted manner or a trajectory that is selected and to be predefined in a targeted manner.

The terms excitation radiation and excitation light, on the one hand, and manipulation radiation and manipulation light, on the other hand, are used synonymously in this description.

The term detection light is understood to mean light which is emitted by the sample on account of the excitation and which is intended to be detected by means of the entire optical arrangement. Detection light can be fluorescent light.

For the purposes of this description, the term pupil plane is understood to mean an optical plane which, in an operating state of the optical arrangement in a laser scanning microscope, is optically conjugate with respect to a back objective pupil of the microscope objective being used in each case. By way of example, in an operating state of the arrangement according to the invention for scanning, the first, second, third and fourth pupil planes are optically conjugate with respect to the back pupil of the microscope objective. Since the position of the back objective pupil varies, the pupil planes are exactly optically conjugate with respect to the back objective pupil generally only for one objective. For the other objectives, the pupil planes are approximately optically conjugate with respect to the back objective pupil. The terms pupil and pupil plane are used synonymously in the present description.

In principle, as many pupils as desired can be generated with the arrangement according to the invention. However, important applications already benefit from four pupils imaged onto one another with manageable adjustment complexity and low optical losses.

The scan optical unit, that is to say the first focusing device, generally consists of an arrangement of lenses by which a first pupil plane equivalent to the back objective pupil is generated.

When mention is made of coordinate directions in the context of the present description, Cartesian coordinates, are intended to be understood. By way of example, the first coordinate direction can be the y-direction and the second coordinate direction can be the x-direction. A coordinate system is often chosen such that the optical axis of a system coincides with the z-axis.

In principle any focusing components, such as lenses or lens groups can be used as second and third focusing devices for generating a pupil plane. Particularly preferably, concave mirrors, and particularly toric or spherical concave mirrors, are used as first and/or second focusing device.

In this case, it may be advantageous if the optical path via the first concave mirror is designed such that a magnification ($|V|>1$) or a reduction ($|V|<1$) is achieved. That is advantageous particularly if different scanners are intended to be combined with one another. By way of example, it is known that resonant MEMS scanners can achieve only specific diameters if resonant frequency and dynamic mirror deformation are given. On the other hand, there is an optimum size for quasi-static galvanometer scanners, which does not coincide with the size of the resonant MEMS scanner. For an optimum optical combination of both scanner systems, an adaptation of the pupil diameters by way of a magnification stage can be very expedient. Within certain limits, deviations from a 1:1 imaging can be permitted here, as a result of which optionally scanners of different sizes can be situated in the respective positions.

The optical arrangement according to the invention is distinguished by a high flexibility. By way of example, the second beam deflection device and/or the third beam deflection device can also be a stationary mirror, a mirror whose surface can be actively curved, or some other wavefront-altering element. By way of example, with a mirror whose surface can be actively curved, or with some other wavefront-altering element, it is possible to alter the focusing along the optical axis, for example in the z-direction, and a z-scan can be carried out in this sense. Furthermore, with such a wavefront-altering element it is possible to compensate for aberrations on account of refractive index mismatches upon increased penetration depth in the sample. A mirror whose surface can be actively curved is generally initially flat and can then be deformed, for example to form a concave mirror.

The term variable beam deflection means denotes a component which permits any type of adjustment or setting and thus deflects incident light or incident radiation differently depending on said adjustment or setting. In particular, variably adjustable mirrors are intended here.

Switching an optical beam course between a first beam path and a second beam path means that the light or the radiation passes through either the first beam path or the second beam path depending on the switching state. The first and second beam paths are different here, that is to say that there are parts of the first beam path which are not part of the second beam path, and vice versa. In principle, however, a discrimination can also be effected on the basis of a specific property of the electromagnetic radiation, that is to say of the excitation radiation or of the manipulation radiation. In particular, the variable beam deflection means can reflect or transmit the incident excitation radiation or manipulation radiation depending on the polarization and/or wavelength thereof.

In order to realize the present invention, with regard to the first and second beam paths what is of importance, in principle, is that, in the case of the first beam path, the excitation radiation and/or the manipulation radiation are/is guided via the first scanner and the second beam deflection device, specifically the second scanner, and that, in the case of the second beam path, the excitation radiation and/or the manipulation radiation are/is guided via the first scanner and the third beam deflection device, in particular the third scanner. In one expedient configuration of the optical arrangement according to the invention, the first beam path passes via the third focusing device and/or the second beam path passes via the second focusing device.

In principle, in order to realize the present invention, with regard to the relative position of the pupil planes with respect to one another all that is important is that the pupil planes are in each case optically conjugate with respect to one another. In preferred variants of the optical arrangement according to the invention, relative to the excitation radiation and the manipulation radiation, the second pupil plane lies beam-upstream of the first pupil plane and the third pupil plane lies beam-upstream of the first and/or the second pupil plane.

The feature that the second beam deflection device, in particular the second scanner, is bypassed in the case of the first beam path is intended to express the fact that manipulation radiation which takes the first beam path does not come into contact with the second scanner. Accordingly, a possible movement of said second scanner cannot influence the manipulation radiation.

Correspondingly, the feature that the third beam deflection device, i.e. the third scanner, is bypassed in the case of the second beam path is intended to express the fact that excitation radiation that takes the second beam path does not come into contact with the third scanner.

The present invention is suitable particularly for confocal laser scanning fluorescence microscopy. In this case, a microscope objective serves for guiding and focusing excitation radiation and/or manipulation radiation on a sample or into a region of a sample and also for guiding and collimating detection light originating from that region of the sample that is illuminated with excitation radiation and/or manipulation radiation.

In the context of the present description, the term detection module denotes that component which ultimately detects the detection light emitted by an illuminated sample. Such a detection module has at least one radiation detector and can include colour filters and confocal stops, depending on the purpose of use.

A central concept of the present invention can be considered that of creating, using suitable focusing means, such as a concave mirror, a further pupil plane in which a further scanner can be arranged. A further fundamental concept of one variant of the invention then consists, with the aid of a variable beam deflection means, in guiding the beam of the excitation radiation and/or manipulation radiation either via a first beam path, which includes the third beam deflection device, i.e. the third scanner, and bypasses the second beam deflection device, i.e. the second scanner, or alternatively via a second beam path, which includes the second beam deflection device, i.e. the second scanner, and bypasses the third beam deflection device, i.e. the third scanner. Particular advantages can then be achieved if the second scanner for the specific coordinate direction and the third scanner for said coordinate direction are qualitatively different, particularly when the second scanner is a resonance scanner and the third scanner is a quasi-static scanner. With the aid of the variable beam deflection means, according to the invention it is thus possible to switch back and forth between the fast scanner and the slow scanner. Since such switching of the beam path can be realized extremely rapidly (of the order of magnitude of 1 ms or less) in principle, it is also possible to switch between the two beam paths and thus between a manipulation mode and an imaging mode extremely rapidly.

The arrangement according to the invention is moreover powerful and can be used for solving different problems.

The optical arrangement according to the invention is particularly suitable for use in a confocal laser scanning fluorescence microscope. The laser scanning microscope according to the invention can thus preferably be a laser scanning fluorescence microscope.

The optical arrangement according to the invention and the laser scanning microscope according to the invention can preferably be used for manipulating biological samples in three dimensions. However, applications in material microscopy are also conceivable. A fast switching between different modes, such as between an optical manipulation and an imaging by means of laser raster scanning is also possible. The optical arrangement according to the invention can also operate for a multiplicity of wavelength combinations, without a redesign being necessary.

The arrangement according to the invention is also able to be used for optical manipulation, light sheet microscopy and for other methods in which a sample is scanned by means of a laser beam.

One major advantage of the present invention is that it becomes possible, in a laser scanning microscope, to carry out an imaging or an optical manipulation using quasi-static scanners, on the one hand, and a fast imaging by means of resonant scanners, on the other hand.

The term quasi-static scanner denotes a scanner which is not operated resonantly but rather, comparatively slowly, quasi-statically. Specifically, a drive curve can be impressed on a quasi-static scanner. Said drive curve can be linearized, for example, such that the same residence duration can be allocated to each pixel. Resonant scanners allow only sine-like movements, which, however, can have a significantly higher frequency. A resonant scanner or resonance scanner will operate in a mechanical resonance, in general comparatively much faster than a quasi-static scanner. Both the quasi-static scanner and the resonantly operated scanner can be realized by a galvanometric scanner, also referred to as galvoscanner, or a MEMS scanner.

In principle, acousto-optical devices, such as acousto-optical scanners, can also be used for the beam deflection devices, i.e. the scanners.

The invention enables switching to be effected very rapidly between a manipulation mode and an imaging. Very rapidly here means that the switching can be effected more rapidly than approximately 10 ms or more rapidly than 1 millisecond (ms).

This rapid switching is possible without the need to switch additional moving parts for beam path switching in the beam course. The instabilities and further technical problems often associated therewith can therefore be avoided.

Furthermore, a three-dimensional optical manipulation, for example a targeted spatial bleaching (keywords: FRAP, uncaging) or optogenetic switching of ion channels etc. and subsequent switching to a possibly very rapid imaging is also possible. For a three-dimensional optical manipulation, a possibility for influencing the three spatial degrees of freedom is required. In this case, three optical elements are necessary. The third dimension can be addressed via a dynamic wavefront-curving mirror, for example. Such components that can be used to alter an axial focal position are also referred to as z-scanning or adaptively defocusing elements. These elements can be augmented by optical mirror scanners very well on account of their geometric dimension. The axial movement of a focal position in the direction of the z-coordinate is thus effected by influencing a wavefront for a given beam direction and thus differs fundamentally from lateral scan movements (in the x- and y-directions) in which the beam direction is adjusted via deflectable mirrors.

The present invention can be used advantageously in respect, too, of the boundary condition that imaging and manipulation are intended to be carried out by means of the same scan lens. In this case, only one port is occupied on the microscope stand. One particular advantage of the arrangement according to the invention is, moreover, that it can operate with a multiplicity of combinations of wavelengths of the excitation radiation, on the one hand, and of the manipulation radiation, on the other hand.

Particular challenges arise for tasks described above if the wavelengths for the manipulation and the imaging are intended to be identical. For the case—which also has practical relevance—where both wavelengths are different, it is possible to use colour splitters.

Besides optical manipulation, xy/z-scanning systems, in particular with adaptive defocusing, are also very well suited to scanning arbitrary trajectories and planes in a three-dimensional sample in an imaging fashion. That is advantageous particularly if fast imaging of defined structures within a volume, in particular with multi-photon excitation, were desired. By way of example, a neuron which follows an irregular course in a three-dimensional volume can be imaged. If said neuron is intended to be imaged very rapidly or the signal transduction, e.g. Ca(2+) waves, along said neuron is intended to be measured optically, the optical arrangement according to the invention is able to track this structure running in the volume.

The present invention can also be used beneficially in so-called light sheet microscopy. This is an old technology that was developed by Zsigmondy and Siedentopf in 1902/1903 at Carl Zeiss for colloid research. Having almost faded into oblivion for a long time, the method experienced a renaissance as a result of new work by E. Stelzer. This was stimulated in particular by the great progress in the processing of digital data.

In light sheet microscopy, at least in the embodiment which is not based on illumination with a cylindrical lens, the task likewise involves scanning a sample using a laser beam. Here, too, a plurality of pupils are particularly advantageous since, besides beam scanning in two dimensions, dynamic beam formations are also intended to be carried out; see, for example, Dean et al.: Deconvolution-free subcellular imaging with axially swept light sheet microscopy, Biophysic. J., Vol. 108, 2807-2815 (2015). The optical arrangement according to the invention and the laser scanning microscope according to the invention can be used advantageously here as well.

The optical arrangement according to the invention can additionally be used both for a linear fluorescence excitation and for a non-linear fluorescence excitation, for example for multi-photon microscopy. All customary and known methods are possible with the arrangement (2-, 3- or multi-photon fluorescence; CARS, SRS, etc.). Primarily two-photon microscopy is nowadays a standard method for examining living samples. In so-called neuro-imaging three-dimensional manipulations of the sample play an important part for understanding neurobiological processes in the brain of living animals.

In principle, for the scanners used all that is important is that a beam deflection in the respective coordinate direction is carried out with the desired speed and accuracy. Particularly preferably, the second scanner is a resonance scanner and the third scanner is a galvanometric scanner. It proves to be particularly advantageous here for the second scanner, that is to say the fast resonance scanner, to be bypassed in the case of the second beam path, that is to say in other words no longer to take effect. That means that the fast second scanner can be switched out very rapidly. In principle, the second and third scanners are interchangeable, that is to say that it may also be expedient if the third scanner is a resonance scanner and the second scanner is a quasi-static scanner. Both variants can be advantageous in specific situations.

Both variants enable very rapid switching back and forth between an imaging mode, in which the fast scanner is used, and an excitation mode, which is carried out by means of the slow quasi-static galvanometric scanner.

Since, for an imaging mode, it is generally sufficient if a fast scanner is available for one coordinate direction, in a further advantageous variant the first scanner can likewise be a comparatively slow scanner such as a galvanometric scanner.

In principle, a two-dimensional scanner, e.g. a two-dimensional MEMS scanner having a single pivoting point, can also be arranged in the first pupil plane situated spatially the closest to the scan optical unit.

In that case it is also possible to position a resonant scanner in each of the pupils, wherein the oscillation axes are formed such that the scanned lines in the sample advantageously, but not necessarily, form an angle of 90°. Consequently, although the image field cannot be rotated continuously, an adaptation to a sample geometry is possible within certain limits. However, this mode requires the optical units, in particular the concave mirrors, to transmit a sufficiently large field.

For the variable beam deflection means used for switching between the first beam path and the second beam path, all that is important, in principle, is that the desired switching is possible sufficiently rapidly. In preferred variants, the variable beam deflection means has at least one variably positionable mirror. Particularly expediently, very light mirrors are used here in order that the masses to be moved and thus the forces that occur and are necessary are kept small. The variable beam deflection means can consist of the variably positionable mirror.

The variable positionability of the mirror can be technically realized in a variety of ways, in principle. In embodiments that are comparatively uncomplicated to realize, means are present for shifting the mirror into and out of the beam course or for pivoting the mirror into and out of the beam course.

In further comparatively uncomplicated variants, which are additionally distinguished by mechanically expedient properties, the mirror is a rotary mirror with a galvanometric rotation device. Owing to the comparatively low mass moments of inertia, galvanometric scanners are particularly well suited to fast switching between different beam paths.

For the mirror per se all that is important, in principle, is that the excitation and/or manipulation radiation is reflected sufficiently effectively. If different properties are intended to be achieved for different wavelengths, it may be advantageous if the variable beam deflection means comprises a dielectric and/or dichroic mirror.

One particularly preferred embodiment variant of the optical arrangement according to the invention is distinguished by the fact that the variable beam deflection means comprises a wavelength-dependent and polarization-dependent dielectric and/or dichroic mirror, wherein said mirror transmits excitation radiation and/or manipulation radiation with a first wavelength and a first polarization state, reflects excitation radiation and/or manipulation radiation with the first wavelength and a second polarization state, which is different from the first polarization state, and transmits fluorescent light emitted by a sample with a red-shifted wavelength independently of the polarization state thereof.

By way of example, in this case, the first polarization state relative to the dielectric and/or dichroic mirror can be s-polarization and the second polarization state relative to the dielectric and/or dichroic mirror can be p-polarization. In principle, however, the opposite allocation is also possible, relative to the dielectric and/or dichroic mirror, that is to say that the first polarization state can be p-polarization and, correspondingly, the second polarization state can be s-polarization.

The arrangement of such a dielectric and/or dichroic mirror in the beam course advantageously enables switching between the first beam path and the second beam path of the excitation radiation and/or of the manipulation radiation by switching between s-polarization and p-polarization.

Particularly expediently, excitation radiation having the first polarization and manipulation light having the second polarization are radiated in. That means that, for example, the manipulation radiation is guided via the first beam path, i.e. via the third scanner, to the scan optical unit and thus further to the microscope objective and, correspondingly, the excitation radiation is guided via the second beam path, i.e. via the second scanner, to the scan optical unit and further to the microscope objective.

For the purpose of suitable use of the above-described wavelength-dependent and polarization-dependent dielectric and/or dichroic mirror, in preferred variants of the optical arrangement according to the invention, beam-upstream of the wavelength-dependent and polarization-dependent mirror a variable polarization rotation device is arranged in the beam course.

Said variable polarization rotation device can comprise for example an electro-optical modulator (EOM) and/or a half-wave plate that is shiftable into and out of the beam course.

The variable beam deflection means, particularly if a wavelength-dependent and polarization-dependent dielectric and/or dichroic mirror of the type described above is used, can comprise at least one fixedly positioned mirror.

In preferred configurations of the laser scanning microscope according to the invention, a device for multi-point illumination with a plurality of illumination channels is present. In this case, the present invention makes it possible that for example the light of one illumination channel, for example manipulation radiation, is guided on the first beam path and the light of the further illumination channels, i.e. excitation radiation, is guided on the second beam path. In this case, the further illumination channels can be used for imaging.

In one preferred variant, the device for multi-point illumination comprises a multi-channel AOTF for controlling the individual illumination channels. The spectral composition and the intensity of the light in the individual illumination channels can be set individually and separately in this case.

Expediently, a variable polarization rotation device, such as a half-wave plate and/or an electro-optical modulator, can be present for at least one of the illumination channels. By suitably setting the polarization, for example for manipulation radiation, what can thus be achieved is that the manipulation radiation is guided in the relevant illumination channel via a specific desired beam path. The excitation radiation can then be guided on the respective other beam path.

However, further pupil planes also enable interventions in the wavefront of the excitation radiation and/or of the manipulation radiation. From this standpoint it may be advantageous if the further beam deflecting component is an adjustable mirror, the surface of which can be actively curved, or a segmented mirror or some other device for manipulating the wavefront.

By way of example, the wavefront can be manipulated by elements of the type described in J. Biomed. Opt. 21(12), 121507, 12 Oct. 2016, see FIG. 2 therein, such that a refocusing in the sample is achieved with high speed.

Wavefront-altering elements of this type are generally introduced into the beam course by way of comparatively complex relay optical units. Particularly for systems in which confocal measurement is also intended to be carried out, said relay optical units lead to a considerable and often unacceptable light loss and furthermore are expensive and difficult to adjust. Apart from that, fast switching of the beam path between manipulation and imaging in the manner described above is scarcely possible with relay optical units.

The optical arrangement according to the invention affords considerable improvements in this respect, too. A further mode, which supports three-dimensional manipulations such as are used in optogenetics, for example, can be made available by the arrangement of the invention by a fast wavefront-shaping element being introduced into one of the pupil planes. Such elements are offered for example by Revibro Optics (Bozeman, Mont. 59717). Of course, alternative components are also possible here which make available a desired function, but require an optical pupil for this purpose. With the rapidly adjustable z-scan element or adaptively defocusing element, in combination with the quasi-static scanners it is possible to carry out an optical manipulation in a three-dimensional volume.

One major advantage of the arrangement according to the invention also consists in the fact that it is always possible to perform wavefront influencing in a pupil or in an intermediate image outside the arrangement according to the invention, since the pupil remains stationary during the scan process in the case of the arrangement according to the invention.

In a further particularly preferred embodiment variant of the optical arrangement according to the invention, a control unit is present for driving the first scanner, the second beam deflection device, the third beam deflection device and/or the variable beam deflection means in a manner coordinated with one another. Said control unit can be a PC, but also in principle other, programmable components such as microcontrollers.

Particularly advantageously, the control unit can be configured to drive the first scanner, the second beam deflection device, the third beam deflection device and/or the variable beam deflection means in a manner coordinated with one another in such a way that excitation radiation or manipulation radiation is applied to the same sample locations independently of whether the first or the second beam path is traversed. An embodiment variant is preferred in which, depending on a position of the variable second beam deflection means, the first scanner is tracked such that excitation light or manipulation light is applied to the same location on the sample independently of whether the first beam path or the second beam path is traversed.

Furthermore, the control unit can serve to drive further components of the optical arrangement according to the invention, for example the variable beam deflection device, a variable polarization rotation device and/or a device for manipulating the wavefront, such as a segmented mirror or a mirror whose surface can be actively curved.

To that end, variants of the laser scanning microscope according to the invention are particularly preferred in which a device for manipulating the polarization, which can also be referred to as a polarization rotation device, a half-wave plate, is provided for at least one of the illumination channels. With said device for manipulating, that is to say for switching, the polarization, the beam course for at least one illumination channel can be switched back and forth between the first beam path and the second beam path.

One particular advantage of the present invention is, moreover, that it can be used in principle for different microscope techniques.

By way of example, the laser scanning microscope according to the invention can be configured for contrast generation on the basis of at least one non-linear contrast principle. The non-linear contrast principle can be multi-photon fluorescence, for example two- or three-photon fluorescence, CARs (coherent anti-stokes raman scattering) or SRS (stimulated raman scattering). Particularly preferably, the microscope according to the invention is a two-photon laser scanning microscope.

Particularly preferably, the microscope according to the invention can also be a confocal microscope, and specifically a confocal laser scanning fluorescence microscope. A microscope is referred to as confocal if a pinhole is present in a plane that is conjugate with respect to the image plane.

Owing to the concentration of the excitation volume as a result of the non-linearity of the multi-photon fluorescence, such a confocal stop is not absolutely necessary in the case of a multi-photon scanning microscope or multi-photon fluorescence scanning microscope.

BRIEF DESCRIPTION OF THE DRAWINGS

Further advantages and features of the invention are explained below with reference to the schematic figures, in which.

DESCRIPTION OF THE EMBODIMENTS

Identical and identically acting components are generally identified by the same reference signs in all of the figures.

By way of example, the case in which a spatially targeted manipulation in a sample is performed by means of quasi-static scanners is considered below. Switching to an imaging is then intended to be effected very rapidly. What is taken as a basis here is the desire to record images of a specific size at a so-called video rate. In the case of laser scanning microscopes, this is possible using so-called resonance scanners, for example. For the following example from FIG. 1 it is furthermore assumed that both the optical manipulation and the excitation of fluorescence for the imaging are realized with a laser line at 488 nm, since this is a frequently occurring case of application.

Figure 1:
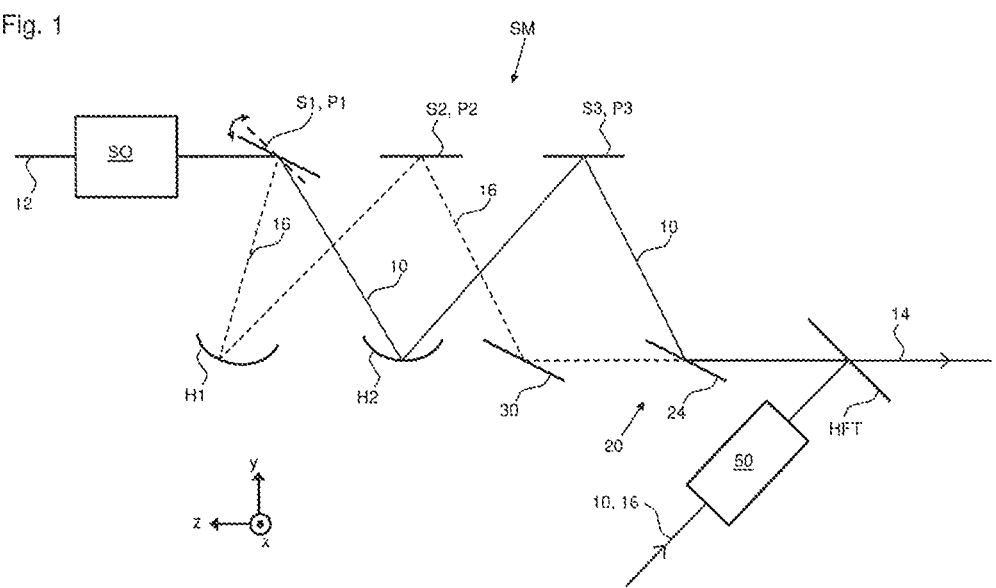
FIG. 1: shows a first exemplary embodiment of an optical arrangement according to the invention.

The problem is solved by means of an optical arrangement SM according to the invention for scanning excitation radiation and/or manipulation radiation in a laser scanning microscope, and specifically in a laser scanning fluorescence microscope, such as is illustrated in FIG. 1. In this case, three scanners S1, S2 and S3 are arranged in a series one behind another, wherein an imaging of all of the scanners onto one another achieves the effect that all the scanners are situated in an optical pupil plane. This is an essential point since this guarantees that the pupil plane remains stationary and an image field is recorded homogeneously, that is to say with a very low so-called edge light falloff.

The optical arrangement SM comprises as an essential component firstly a scan optical unit SO for providing a first pupil plane P1. In an operating state, that is to say in a state in which the optical arrangement SM interacts with a laser scanning microscope or is incorporated into said microscope, said first pupil plane P1 is optically conjugate with respect to a back objective pupil of the microscope objective. A first scanner S1 as first beam deflection device is arranged in said first pupil plane P1, said first scanner serving for scanning excitation radiation and/or manipulation radiation 10 in a first coordinate direction y. The scanner S1 can be for example a quasi-static, galvanometric scanner. During operation, the scanner mirror S1, shown schematically, is pivoted back and forth about an axis which is oriented vertically in FIG. 1, i.e. is perpendicular to the plane of the drawing and runs parallel to the x-direction.

A first focusing device is then present, which is a first concave mirror H1 in the example shown. Said first concave mirror H1 serves for providing a second pupil plane P2, which is optically conjugate with respect to the first pupil plane P1. A second scanner S2 as second beam deflection device is arranged in the second pupil plane P2, said second scanner serving for scanning the excitation radiation and/or manipulation radiation in a second coordinate direction x, which is different from the first coordinate direction y. The xyz-coordinate system illustrated schematically in FIG. 1 is a Cartesian coordinate system, i.e. the first coordinate direction y is perpendicular to the second coordinate direction x. The direction of the optical axis 12 runs parallel to the z-axis in the region between the intermediate image plane ZB and the scan optical unit SO. The second scanner S2 can be a resonance scanner, for example. During operation, the scanner mirror S2, shown schematically in FIG. 1, is pivoted back and forth about an axis which is oriented parallel to the z-direction.

Furthermore, a second focusing device is present, which is a second concave mirror H2 in the example shown. The second concave mirror H2 serves for generating a third pupil plane P3, which is optically conjugate with respect to the first pupil plane P1. A third scanner S3 as third beam deflection device is arranged in said third pupil plane P3, said third scanner serving for scanning the excitation radiation and/or manipulation radiation 10 likewise in the second coordinate direction x. The third scanner S3, like the first scanner S1, can be a quasi-static scanner, and in particular a galvanometric scanner.

Beam-upstream of the second scanner S2 and the third scanner S3, a variable beam deflection means 20 is present according to the invention for switching the optical beam course between a first beam path and a second beam path. In the example illustrated in FIG. 1, the variable beam deflection means 20 is formed form a wavelength-dependent and polarization-dependent dielectric and/or dichroic mirror 24 and a stationary mirror 30. Relative to the excitation radiation 16 and the manipulation radiation 10 beam-upstream of the dielectric and/or dichroic mirror 24, moreover, the illustration shows a principal colour splitter HFT of a microscope according to the invention and, beam-upstream thereof, a polarization rotation device 50. The principal colour splitter HFT, as shown schematically in FIG. 1, reflects incident manipulation radiation 10 and excitation radiation 16 in a manner known in principle. By contrast, detection light 14 coming from the opposite direction, that is to say from the scan optical unit SO, said detection light being red-shifted in comparison with the excitation light, i.e. having a longer wavelength, is allowed through or transmitted by the principal colour splitter HFT. The polarization rotation device 50 can be for example a half-wave plate, which is mechanically shifted into or out of the beam course or is rotated about the optical axis in a manner remaining in the beam course, or an electro-optical modulator, with which the polarization direction of the manipulation radiation 10 or of the excitation radiation 16 can be set in a manner known per se.

According to the invention, in this case the first beam path runs from the variable beam deflection means 20, 24, 30 via the third scanner S3 whilst bypassing the second scanner S2 to the first scanner S1 and the second beam path runs from the variable beam deflection means 20, 24, 30 whilst bypassing the third scanner S3 via the second scanner S2 to the first scanner S1.

In the example illustrated in FIG. 1, the first beam path additionally runs via the second concave mirror H2 and the second beam path runs via the first concave mirror H1.

What is essential is that the beam path via the second scanner S2 and thus the effect of said second scanner S2 is deactivated or switched off by actuation of the polarization rotation device 50. Switching between the two-dimensional scans with and without a resonant scanner is thus effected.

Figure 3:
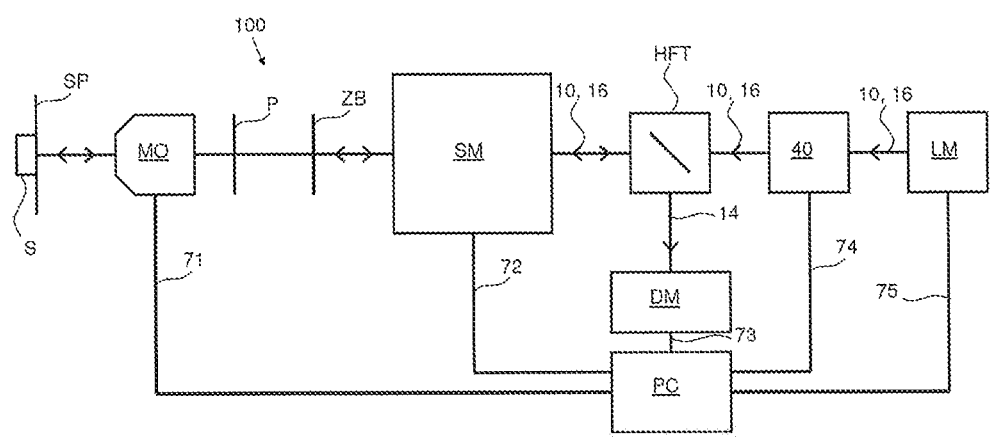
FIG. 3: shows a schematic illustration of a laser scanning microscope according to the invention.

The construction of a laser scanning microscope according to the invention is explained with reference to FIG. 3. The laser scanning microscope 100 illustrated schematically therein comprises as essential components a laser module LM, a principal colour splitter HFT, an optical arrangement SM according to the invention for scanning excitation and manipulation light 10, a microscope objective MO and a detection module DM. The laser module LM serves as a radiation source for excitation light 16 and manipulation light 10. In the example illustrated schematically in FIG. 3, the excitation light 16 or manipulation light 10 emitted by the laser module LM impinges on a multi-point module 40, which separates the incoming light beam into a plurality of beam bundles which, finally, are focused into different focal volumes on or in a sample S. The spectral composition and the intensity can be set separately for the individual partial beams, for example by means of a multi-channel AOTF. The laser module LM, the multi-point module 40, the optical arrangement according to the invention for scanning SM, an objective turret (not shown) and the detection module DM are connected via connecting lines 71 to 75 to a control and evaluation unit PC, which can be a commercially available computer.

After passing through the multi-point module 40, the excitation light 16 or manipulation light 10 passes via the principal colour splitter HFT to the optical arrangement SM according to the invention for scanning the excitation light 16 and/or the manipulation light 10. The scan optical unit SO of the optical arrangement SM focuses the excitation light 16 or manipulation light 10 into an intermediate plane ZB. Via further components, for example mirrors, which are not illustrated in FIG. 3, the excitation light 16 or manipulation light 10 passes via a back objective pupil P into the microscope objective MO, which focuses the light into a plurality of focal volumes on or in the sample S situated in a sample plane SP. The number of separate focal volumes corresponds to the number of separate beam bundles generated in the multi-point module 40. If the multi-point module 40 were omitted, the excitation or manipulation light 10, 16 would be focused into a focal point. With the optical arrangement SM according to the invention for scanning, the focal volumes of the excitation or manipulation light 10, 16 are scanned in the intermediate image plane ZB and thus in the sample plane SP, which is optically conjugate with respect to the intermediate image plane ZB.

Firstly, with reference to FIG. 1, an explanation will now be given of the beam course for manipulation light 10 which realizes in a sample S, for example, a defined manipulation, for example a defined bleaching along a specific trajectory. Once said bleaching has been carried out, as explained below, the optical arrangement SM according to the invention can be rapidly switched and the sample can be observed in an imaging mode with the aid of excitation light 16.

For this purpose, firstly the functioning of the wavelength-dependent and polarization-dependent dielectric and/or dichroic mirror 24 will be explained. The mirror 24 has a wavelength-dependent reflection in such a way that a polarization-dependent splitting is effected at shorter wavelengths, while both polarization components of the emission are transmitted very well at longer wavelengths.

That will be explained in more specific detail in association with FIGS. 1 and 2. In the embodiment variant in FIG.

1, the switching between the first beam path and the second beam path is effected by targeted setting of the polarization for the excitation light 16, on the one hand, and the manipulation light 10, on the other hand. The dielectric and/or dichroic mirror 24 is designed in a targeted manner with respect to the used wavelengths of the excitation light 16, of the manipulation light 10 and of the detection light 14 typically to be expected and has the following dichroic properties that are explained in joint consideration with FIG. 2.

Figure 2:
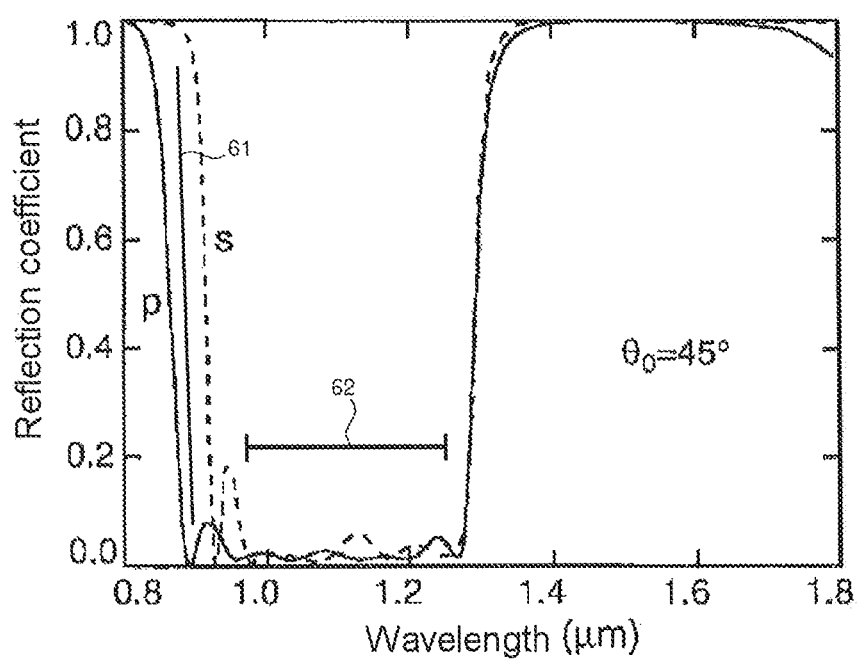
FIG. 2: shows a diagram in which, for a specific dielectric and dichroic mirror, the reflection coefficient is plotted against the wavelength depending on the polarization.

FIG. 2 shows a diagram in which the reflection coefficient of the dielectric and/or dichroic mirror 24 is plotted against the wavelength of the incident light. The data relate to an angle of incidence of the light on the mirror 24 of 45°. The dashed curve relates to s-polarization and the solid curve relates to p-polarization. As is evident from FIG. 2, in the case of a wavelength value identified by the reference sign 61, the reflection coefficient in the case of s-polarization is almost 1 and at the same time the reflection coefficient in the case of p-polarization is almost 0.

The position within the spectral reflection profile ensures that for the manipulation/excitation wavelength either a high reflection (s-polarized component) or a high transmission (p-polarized component) is achieved.

At said wavelength 61, s-polarized light is thus almost completely reflected and p-polarized light is almost completely transmitted. That means that switching the polarization makes it possible to switch between reflection and transmission. The fluorescence emission is identified for example by the region 62. Here both polarization components are transmitted highly efficiently. These properties are utilized in the exemplary embodiment in FIG. 1.

With the aid of the polarization rotation device 50, for the light incident on the third scanner S3 it is possible to adjust the polarization between two mutually perpendicular positions. In this case, the polarization rotation device 50 is arranged such that relative to the dielectric and/or dichroic mirror 24 either s-polarization or p-polarization can be set.

For the case where a manipulation mode is intended to be employed, that is to say that manipulation light 10 is intended to be applied to the sample, s-polarization is expediently set by means of the polarization rotation device 50.

The s-polarized manipulation light 10, coming from the principal colour splitter HFT, impinges on the dielectric and/or dichroic mirror 24. Owing to the s-polarization set, the manipulation light 10 is reflected at the mirror 24 and guided in the direction of the third scanner S3 in the third pupil plane P3. In the exemplary embodiment illustrated in FIG. 1, the third scanner S3 is a quasi-static, in particular galvanometric, scanner that scans the manipulation light 10 comparatively slowly in the x-direction.

The manipulation light 10, coming from the third scanner S3, is then forwarded via the second concave mirror H2 onto the first scanner S1. The first scanner S1 is likewise a quasi-static, in particular galvanometric, scanner that scans the manipulation light 10 comparatively slowly in the y-direction. The second, fast scanner S2 is accordingly deactivated with the use of the manipulation light 10 in the first beam path.

Suitable driving of the first scanner S1 and of the third scanner S3 makes it possible to realize the desired manipulation in the sample, for example the bleaching along a specific trajectory.

An optical element for fast refocusing, such as is offered e.g. commercially by Revibro Optics (Bozeman, Mont. 59717), can also be arranged in a further pupil plane, not illustrated in FIG. 1. With such a variable mirror, the surface of which can be actively curved, or wavefront-modulating element, a very fast variation of the focusing in the z-direction is possible. In this regard, in principle, it is also possible to manipulate three-dimensional trajectories or freely selected volumes in a sample by means of the manipulation light 10.

After the conclusion of the manipulation, it may be desirable to switch the optical arrangement SM into an imaging mode as rapidly as possible. For this purpose, the polarization of the excitation light 16 is set to p-polarization with the aid of the polarization rotation device 50.

The p-polarized excitation light 16, coming from the principal colour splitter HFT, then likewise impinges on the dielectric and/or dichroic mirror 24, but passes through the latter, owing to the p-polarization, and then impinges on the stationary mirror 30. The excitation light is reflected from the stationary mirror 30 in the direction of the second scanner S2 in the second pupil plane P2, which scans the excitation light 16 in the x-direction. In the example shown in FIG. 1, the second scanner S2 is a resonance scanner, that is to say a scanner which is much faster in comparison with the first scanner S2 S1 and third scanner S3. From the second scanner S2, the excitation light 16 then passes onto the first concave mirror H1 and from the latter onto the first scanner S1. Starting from the first scanner S1, the beam course is then the same as that for the manipulation light 10 that was described above.

For detection light 14 which is emitted by the sample S and passes through the optical beam course in the opposite direction, the above consideration does not apply owing to the red-shifted wavelength. It is evident from FIG. 2 that, in a wavelength interval identified by the reference sign 62, the reflection coefficient is very low both for s-polarization and for p-polarization. That means that light in this wavelength range 62, independently of its polarization, is transmitted very well by the dielectric and/or dichroic mirror 24. The mirror 24 is manufactured in a targeted manner such that typical wavelengths of the detection light 14 lie precisely in the interval 62. The result of the exemplary embodiment shown in FIG. 1 is that there it is possible to switch back and forth between the first beam path, which passes via the third scanner S3 whilst bypassing the second scanner S2, and the second beam path, which passes via the second scanner S2 whilst bypassing the third scanner S3, by suitable setting of the polarization of the excitation light 16 and of the manipulation light 10, respectively.

In one particularly preferred configuration of the arrangement according to the invention, the first scanner S1 is tracked in an automated manner, upon a change from the first beam path to the second beam path, or vice versa, specifically such that the beam courses for the first beam path and the second beam path coincide again beam-downstream of the first scanner S1. In this regard, independently of whether the first beam path or the second beam path is selected, light is applied in each case to the same location on the sample. The mutually coordinated actuation of the beam deflection means 20, of the first scanner S1, of the second scanner S2 and/or of the third scanner S3 can be carried out by means of a suitably programmed control unit, for example. If, as described and illustrated schematically in FIG. 1, the deflection angle of the first scanner S1 is switched upon the switching from the first beam path to the second beam path, it is possible to achieve an image congruence between the region scanned in the manipulation process and the region scanned in the fast imaging mode.

Thus, in addition to the scanner function, the first scanner S1 has the function of a changeover switch between the first and second beam paths.

In this regard, what can be achieved as a particular advantage of the invention is that, in a laser scanning microscope, both an optical manipulation and an imaging can be carried out with quasi-static scanners, on the one hand, and a fast imaging can be carried out by means of resonant scanners, on the other hand.

In the case of the exemplary embodiment illustrated in FIG. 1, the beam splitter 24 must also be configured in an exchangeable fashion for this purpose. By contrast, if the beam splitter 24 is arranged in a stationary fashion with the spectral properties described in association with FIG. 2, then it is possible only to switch between manipulation using the quasi-static scanner S3 in P3 and imaging using the resonance scanner S2 in P2, because the fluorescent light passes through the beam splitter 24.

A rotation of the polarization is possible at very high speed. Electro-optical modulators allow a polarization rotation right into the MHz range. Instances of switching between the pupils are thus achieved in the microseconds range. The emitted fluorescent light coming from the sample has a characteristic Stokes shift, the magnitude of which is dependent on the fluorophore considered. This radiation thus has a longer wavelength, which, in the case of the spectral reflection characteristic considered, has the effect that the element transmits both polarization components with high efficiency in this range. A technical problem here is that the behaviour of these layers is greatly angle-dependent. However, such a layer can be produced for an angular variation of approximately 10°. By way of example, the layer having the spectral reflective property can be embodied just as a narrow strip. Alternatively, a plurality of strips having a characteristic respectively adapted for a certain angular range or even graduated-filter-like elements can be produced and integrated.

A rotation of the polarization by means of an electro-optical modulator is possible without any problems within microseconds. However, it is also possible to use other active elements, for example liquid crystal modulators or spatial light modulators (SLM), as long as they lead to a rotation of the polarization or, even more generally, to a polarization component in a desired direction. It would also be possible, for example, to generate only a so-called quarter-wave shift (quarter-wavelength shift), which then leads to a circular or elliptic polarization, for example. Here the s- and p-portions would respectively pass on different paths.

This switching mechanism is very advantageously combined with an active multi-point illumination, such as is described for example in DE 10 2016 102 286.1. This can involve a system for confocal multi-point scanning microscopy. Here, for example, one of the multiple beams can have a polarization rotated by 90°. This is then the manipulation beam, which generally also has a higher intensity. All remaining beams are used for imaging. A switching for example by means of an acousto-optical tunable filter (AOTF) then leads to the desired switching of the illumination beam paths for the manipulation via the pupil P3 or the detection via the scanner S2 in the pupil P2.

After excitation of the sample S by the excitation light 10, the sample S emits detection light 14 in a fundamentally known manner, said detection light passing on substantially the same optical beam course back to the principal colour splitter HFT. The detection light 14 is typically fluorescent light, the wavelength of which is red-shifted in comparison with the wavelength of the excitation light 10 on account of a Stokes shift. This red shift enables the detection light 14 to be separated in the principal colour splitter HFT and the detection light 14 passes, if appropriate via further components (not illustrated) such as mirrors or filters to the detection module DM and is quantitatively detected there. The measurement data of the detection module DM are fed to the control and evaluation unit PC.

The pupils P2 and P3 can be equipped with different optically active or passive elements. In the simplest case, that is respectively a mirror as soon as an active element that is intended to be bypassed is situated in the respective other pupil. By way of example, a resonant scanner can be situated in P2, as described. If said scanner is not needed, light should also not be guided via it, in order to avoid disturbances of the beam as a result of residual movements. Moreover, a resonant scanner has a certain transient response. If there is a desire to realize a very fast switching between a manipulation mode and a fast imaging mode by means of a resonant scanner, then the scanner must oscillate continuously and a connection is made to this movement optically at the corresponding moment.

At the second concave mirror H2 the angle between incident beam and reflected beam is preferably equal to the corresponding angle at the first concave mirror H1 and the rotation axes of the second scanner S2 and of the third scanner S3 preferably lie parallel to one another. What is achieved thereby is that, independently of whether scanning is effected using the second scanner S2 or the third scanner S3, no asymmetrical scan distortions occur during scanning in the sample plane (in this respect, see DE 10 2014 017 001 A1).

The optical arrangement according to the invention, as illustrated in FIG. 1, can be varied in various respects.

Figure 4:
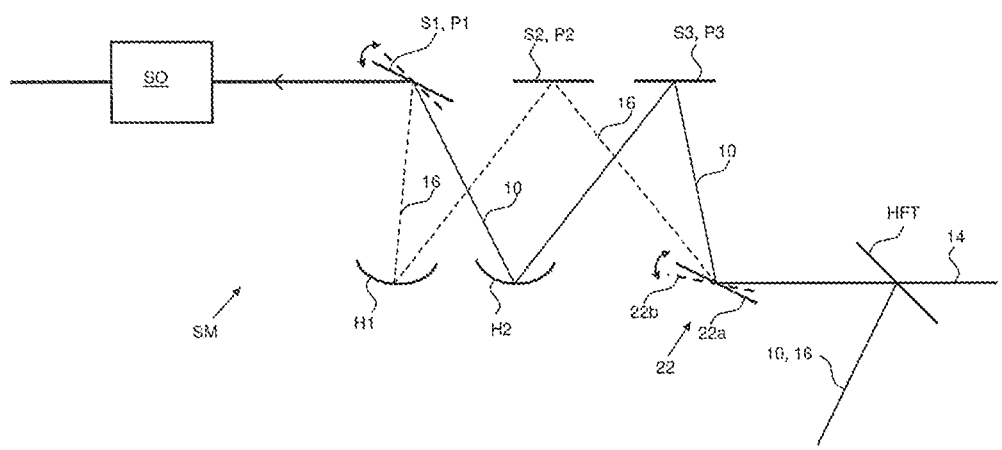
FIG. 4: shows a second exemplary embodiment of an optical arrangement according to the invention.

The exemplary embodiment illustrated in FIG. 4 largely corresponds to that from FIG. 1. The differences are manifested in the variable beam deflection means 20. In the exemplary embodiment shown in FIG. 4, said variable beam deflection means 20 is a rotary mirror 22 with a mechanical rotation device (not illustrated in FIG. 4). The rotation device can be realized e.g. by a galvanometric scanner. This is advantageous since the mass moment of inertia can be kept relatively small.

The rotary mirror 22 in FIG. 4 can be rotated back and forth at least between a first position 22a and a second position 22b. In the first position 22a, which is preferably used for manipulation light 10, the manipulation light 10 coming from the principal colour splitter HFT is reflected in the direction of the third scanner S3. From the third scanner S3 onwards, the first beam path in the exemplary embodiment shown in FIG. 4 corresponds to the situation shown in FIG. 1. In the second position 22b, which is preferably used for excitation radiation 16, the excitation radiation 16 coming from the principal colour splitter HFT is reflected in the direction of the second scanner S2. From the second scanner S2 onwards, the second beam path in the exemplary embodiment shown in FIG. 4 corresponds to the situation shown in FIG. 1. The same applies to detection light 14 passing through the beam course in the opposite direction. A device for adjusting the polarization is not necessary in the embodiment variant in FIG. 4.

As in the variant described in association with FIG. 1, here as well the first scanner S1 can advantageously be tracked in an automated manner with an adjustment of the rotary mirror 22 in order to achieve the effect that, independently of whether the first beam path or the second beam path is selected, excitation radiation 16 or manipulation radiation 10 is applied to the same location on the sample. In the exemplary embodiment from FIG. 4, if the first scanner is tracked, as described, an imaging is possible in the manipulation mode as well, i.e. with the quasi-static scanners S1 and S3, because the fluorescent light coming from the sample is reflected at the rotary mirror 22 in the direction of the principal colour splitter HFT.

The arrangement from FIG. 4 enables an imaging by means of the quasi-static scanner S3, which has the advantage that the movement thereof over the image can be linearized. On the other hand, an imaging can also be effected by means of the resonant scanner S2, with the advantage that a very fast imaging (for example 30 images per second at 512×512 pixels) is made possible here. However, the switching with a rotary mirror 22 is generally not very fast, since in this case the mass of the rotary mirror 22 has to be moved over a comparatively large range.

One major advantage of the optical arrangement according to the invention, therefore, is that it is possible to switch very rapidly between a so-called manipulation mode and a fast imaging mode. That can be done in various ways.

If the excitation light and the manipulation light differ spectrally, firstly a colour filter, e.g. a dichroic mirror, can be used. Such mirrors are variable beam deflection means insofar as their reflection and transmission properties are dependent on the wavelength of the radiation. It should be taken into consideration here that the properties of a dichroic mirror are dependent on the angle of the radiation incident thereon, which under certain circumstances can lead to restrictions of the field of view.

Given an identical wavelength of the manipulation radiation and the fluorescence excitation radiation, in a simple case, as shown in FIG. 4, a reflective element (rotary mirror 22) is pivoted in the beam course and it is thereby possible to switch between P3 and P2 within a few milliseconds. In this case, however, a mirror having a certain mass has to be moved. It is generally difficult to become faster than 10 ms or, even better, faster than 1 ms with such an arrangement. If even faster switching times are required, alternative switching mechanisms, such as non-mechanical switching elements, must be used.

If the same wavelength is intended to be used for manipulation and fast imaging, then a polarization-dependent element such as the above-described dielectric and/or dichroic mirror 24 can be employed. A non-mechanical switching between the pupils P2 and P3, as described above, is thus possible.

While the invention has been illustrated and described in connection with currently preferred embodiments shown and described in detail, it is not intended to be limited to the details shown since various modifications and structural changes may be made without departing in any way from the spirit of the present invention. The embodiments were chosen and described in order to best explain the principles of the invention and practical application to thereby enable a person skilled in the art to best utilize the invention and various embodiments with various modifications as are suited to the particular use contemplated.

LIST OF REFERENCE SIGNS x Second coordinate direction
y First coordinate direction
z Direction of the optical axis
DM Detection module
HFT Principal colour splitter
H1 Second focusing device, first concave mirror
H2 Third focusing device, second concave mirror
LM Laser module/light source
MO Microscope objective
P Pupil plane of the microscope objective MO
PC Control and evaluation unit
P1 First pupil plane
P2 Second pupil plane
P3 Third pupil plane
S Sample
SM Scan module, optical arrangement according to the invention
SO Scan optical unit, first focusing device
SP Sample plane
S1 First scanner, first beam deflection device
S2 Second scanner, second beam deflection device
S3 Third scanner, third beam deflection device
ZB Intermediate image plane
10 Manipulation radiation, manipulation light
12 Optical axis
14 Detection light
16 Excitation radiation, excitation light
20 Variable beam deflection means
22 Rotary mirror
24 Dielectric and/or dichroic mirror
30 Stationary mirror
40 Multi-point module
50 Polarization rotation device
61 Wavelength at which the reflection coefficient is maximally dependent on polarization
62 Wavelength range in which the reflection coefficient is virtually polarization-independent
71-75 Lines from microscope components to PC
100 Laser scanning microscope

What is claimed is:

1. Optical arrangement for scanning at least one of excitation radiation and manipulation radiation in a laser scanning microscope, comprising:
   a scan optical unit as a first focusing device for providing a first pupil plane;
   a first beam deflection device formed by a first scanner arranged in the first pupil plane for scanning at least one of the excitation radiation and manipulation radiation in a first coordinate direction;
   a second focusing device for generating a second pupil plane, which is optically conjugate with respect to the first pupil plane;
   a second beam deflection device for deflecting at least one of the excitation radiation and manipulation radiation, which is arranged in the second pupil plane;
   a third focusing device for generating a third pupil plane optically conjugate with respect to the first pupil plane;
   a third beam deflection device being in the third pupil plane arranged for deflecting at least one of the excitation radiation and manipulation radiation; and
   a variable beam deflection means for switching an optical beam course between a first beam path and a second beam path;
   wherein the first beam path runs at least from the variable beam deflection means via the third beam deflection device whilst bypassing the second beam deflection device to the first scanner; and
   wherein the second beam path runs at least from the variable beam deflection means whilst bypassing the third beam deflection device via the second beam deflection device to the first scanner.

2. Optical arrangement according to claim 1 configured for use in a laser scanning fluorescence microscope.

3. Optical arrangement according to claim 1, wherein at least one of the second focusing device and the third focusing device is a one of concave mirror, a toric concave mirror and a spherical concave mirror.

4. Optical arrangement according to claim 1, wherein the first beam path runs via the third focusing device and wherein the second beam path runs via the second focusing device.

5. Optical arrangement according to claim 1, wherein, relative to the excitation radiation and the manipulation radiation, the second pupil plane lies beam-upstream of the first pupil plane and wherein the third pupil plane lies beam-upstream of the second pupil plane.

6. Optical arrangement according to claim 1, wherein the second beam deflection device in the second pupil plane is a second scanner for scanning at least one of the excitation radiation and the manipulation radiation in a second coordinate direction, which is different from the first coordinate direction.

7. Optical arrangement according to claim 6, wherein the second scanner is a resonance scanner and the third scanner is a quasi-static scanner or wherein the third scanner is a resonance scanner and the second scanner is a quasi-static scanner.

8. Optical arrangement according to claim 1, wherein the third beam deflection device in the third pupil plane is a third scanner for scanning at least one of the excitation radiation and the manipulation radiation in a second coordinate direction, which is different from the first coordinate direction.

9. Optical arrangement according to claim 1, wherein at least one of the second beam deflection device and the third beam deflection device is one of a stationary mirror, an adjustable mirror, the surface of which can be actively curved, and some other wavefront-altering element.

10. Optical arrangement according to claim 1, wherein the first scanner is a quasi-static scanner.

11. Optical arrangement according to claim 1, wherein the variable beam deflection means comprises at least one variably positionable mirror.

12. Optical arrangement according to claim 11, wherein the mirror is a rotary mirror with a galvanometric rotation device.

13. Optical arrangement according to claim 11, wherein means are present for shifting the variable mirror into and out of the beam course or for pivoting the mirror into and out of the beam course.

14. Optical arrangement according to claim 1, wherein the variable beam deflection means comprises at least one fixedly positioned mirror.

15. Optical arrangement according to claim 1, wherein the variable beam deflection means comprises at least one of a dielectric mirror and a dichroic mirror.

16. Optical arrangement according to claim 1, wherein the variable beam deflection means comprises at least one of a wavelength-dependent and polarization-dependent dielectric mirror and a wavelength-dependent and polarization-dependent dichroic mirror, wherein said mirror:
   transmits at least one of the excitation radiation and manipulation radiation with a first wavelength and a first polarization state;
   reflects at least one of the excitation radiation and manipulation radiation with the first wavelength and a second polarization state, which is different from the first polarization state; and
   transmits fluorescent light emitted by a sample with a red-shifted wavelength independently of the polarization state thereof.

17. Optical arrangement according to claim 16, wherein beam-upstream of the wavelength-dependent and polarization-dependent mirror a variable polarization rotation device is arranged in the beam course.

18. Optical arrangement according to claim 17, wherein the variable polarization rotation device is an electro-optical modulator or is a half-wave plate that is shiftable into and out of the beam course.

19. Optical arrangement according to claim 16, wherein the first polarization state relative to the wavelength-dependent and polarization-dependent mirror is s-polarization and in that the second polarization state relative to the wavelength-dependent and polarization-dependent mirror is p-polarization.

20. Optical arrangement according to claim 1, wherein a control unit is present for driving at least one of the first scanner, the second beam deflection device, the third beam deflection device and the variable beam deflection means in a manner coordinated with one another.

21. Optical arrangement according to claim 20, wherein the control unit is configured to drive at least one of the first scanner, the second beam deflection device, the third beam deflection device and the beam deflection means in a manner coordinated with one another in such a way that excitation radiation or manipulation radiation is applied to the same sample locations independently of whether the first or the second beam path is traversed.

22. Laser scanning microscope, comprising:
   at least one laser light source for emitting laser radiation for at least one of exciting and manipulating a sample;
   at least one principal colour splitter for separating at least one of the excitation radiation and manipulation radiation, and wavelength-shifted detection light emanating from a sample;
   at least one microscope objective for guiding and focusing at least one of the excitation radiation and manipulation radiation onto a sample and for guiding and collimating detection light, emanating from the sample, back in the direction of the principal colour splitter;
   a detection module for detecting the detection light; and
   an optical arrangement for scanning excitation radiation and manipulation radiation according to claim 1.

23. Laser scanning microscope according to claim 22, further comprising a device for multi-point illumination with a plurality of illumination channels.

24. Laser scanning microscope according to claim 23, wherein the device for multi-point illumination comprises a multi-channel AOTF for controlling the individual illumination channels.

25. Laser scanning microscope according to claim 23, further comprising a device for rotating the polarization for at least one of the illumination channels.

26. Laser scanning microscope according to claim 22, configured for contrast generation on the basis of at least one of the following non-linear contrast principles: multi-photon fluorescence, two-photon fluorescence, three-photon fluorescence, CARS and SRS.

27. Laser scanning microscope according claim 22, being a confocal microscope.

* * * * *